United States Patent [19]

Lemaire et al.

[11] Patent Number: 5,421,295
[45] Date of Patent: Jun. 6, 1995

[54] METHOD AND DEVICE FOR AUTOMATIC INJECTION OF AN ADDITIVE INTO THE FUEL TANK OF A MOTOR VEHICLE

[75] Inventors: Jacques Lemaire, Osny; Denis Petta, Aulnay-Sous-Bois; Guy Renauld, Deuil-la-Barre, all of France

[73] Assignee: Rhone-Poulenc Chimie, Courbevoie Cedex, France

[21] Appl. No.: 200,506

[22] Filed: Feb. 23, 1994

[30] Foreign Application Priority Data

Feb. 23, 1993 [FR] France .................................. 93 02046

[51] Int. Cl.⁶ .............................................. F02B 75/12
[52] U.S. Cl. .................................. 123/179.7; 123/1 A
[58] Field of Search ..................... 123/1 A, 575, 179.7, 123/179.8, 179.9, 179.12, 179.13

[56] References Cited

U.S. PATENT DOCUMENTS

| | | |
|---|---|---|
| 2,623,638 | 12/1952 | Dunn et al. |
| 4,161,160 | 7/1979 | Hicks et al. ........................ 123/179.7 |
| 4,557,221 | 12/1985 | Kamel et al. ....................... 123/1 A |
| 4,568,248 | 2/1986 | Harders . |
| 4,596,277 | 6/1986 | Djordjevic ........................ 123/1 A |
| 4,621,593 | 11/1986 | Rao et al. . |
| 4,936,261 | 6/1990 | Naumann et al. ................... 123/1 A |
| 4,971,118 | 11/1990 | Cluff ................................ 123/1 A |
| 5,163,407 | 11/1992 | Yoshida et al. ..................... 123/1 A |
| 5,331,924 | 7/1994 | Kraus ................................ 123/1 A |
| 5,331,994 | 7/1994 | Bryan, III et al. ................. 123/1 A |

FOREIGN PATENT DOCUMENTS

| | | |
|---|---|---|
| 1212597 | 3/1960 | France . |
| 2668203 | 4/1992 | France . |
| 3626419 | 2/1988 | Germany . |

OTHER PUBLICATIONS

Automotive Engineering, No. 8, Aug. 1, 1985, Warrendale pp. 70–78, Fuel Additives Influence Particulate Terap Regeneration, pp. 73, 74.

Primary Examiner—Henry C. Yuen
Assistant Examiner—Erick Solis
Attorney, Agent, or Firm—Burns, Doane, Swecker & Mathis

[57] ABSTRACT

A method and apparatus for the automatic injection of an additive into the fuel tank of a motor vehicle, from an on-board additive tank in which the quantity of additive to be withdrawn from the additive tank is determined using an on-board computation unit, and the quantity of additive thus determined is injected by pulsed atomization, this atomization being carried out directly into the liquid bulk of the fuel. This pulsed atomization is preferably carried out by controlling a positive-displacement piston, where the number of strokes of the piston which is automatically determined as a function of the quantity of the additive to be withdrawn.

14 Claims, 3 Drawing Sheets

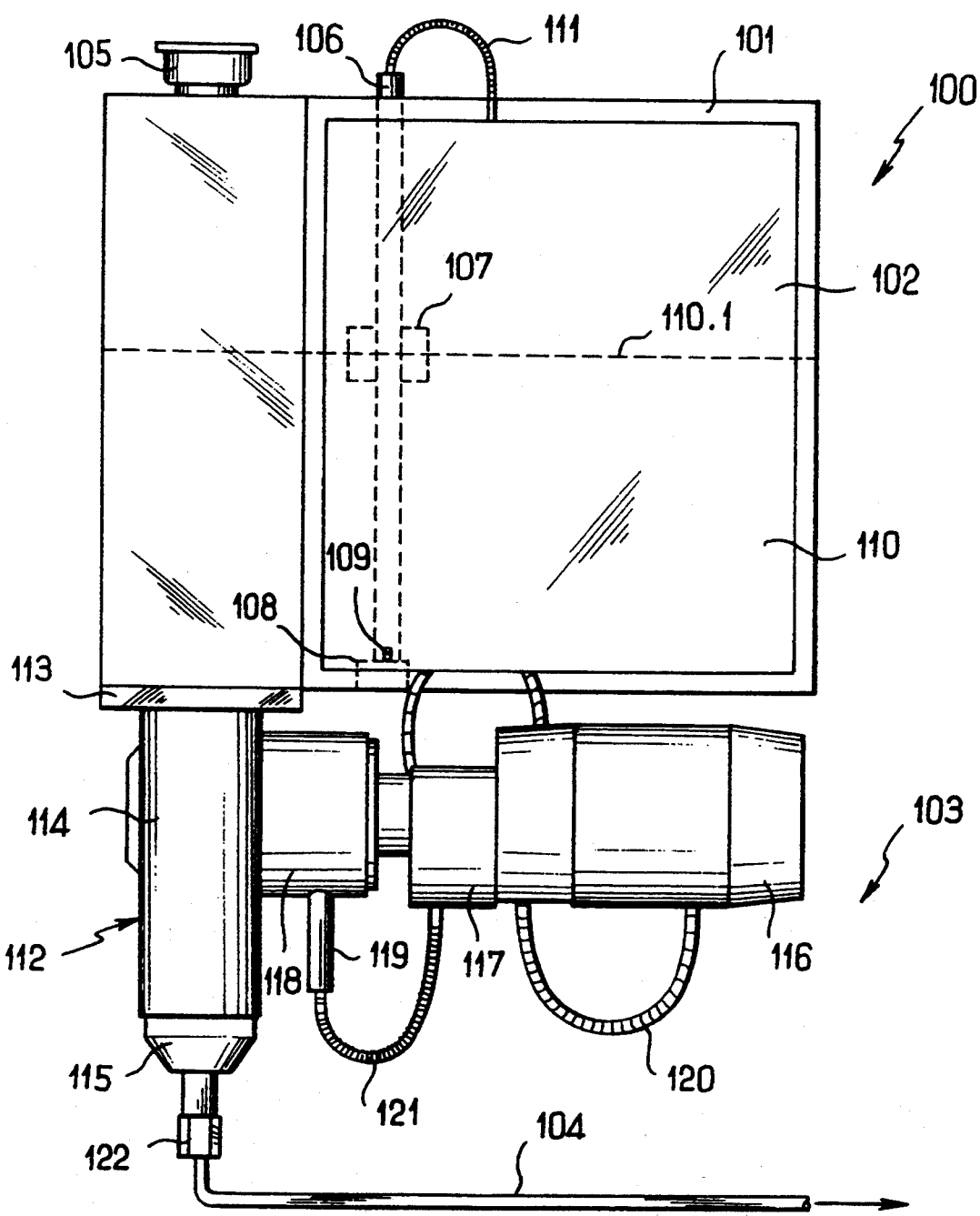
FIG_1
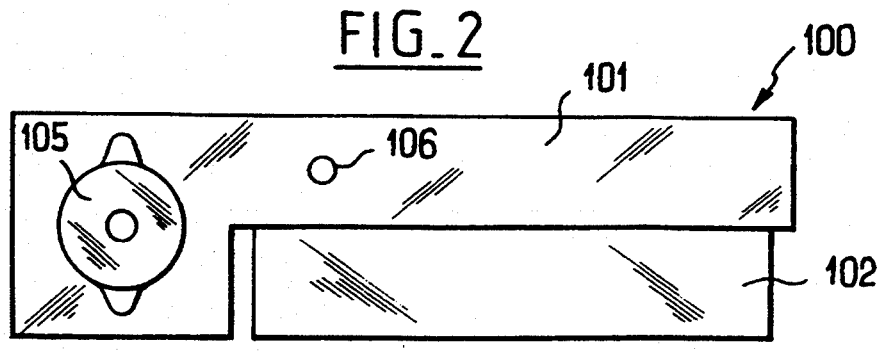
FIG_2

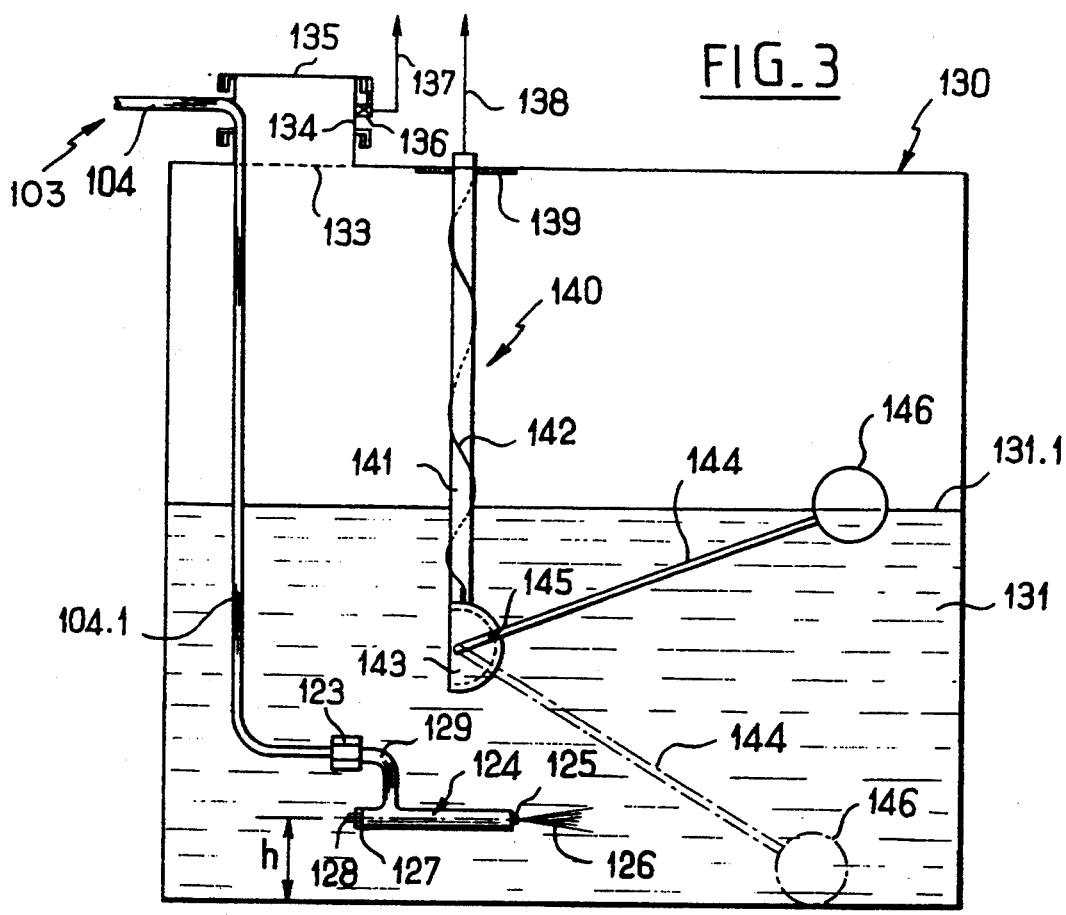
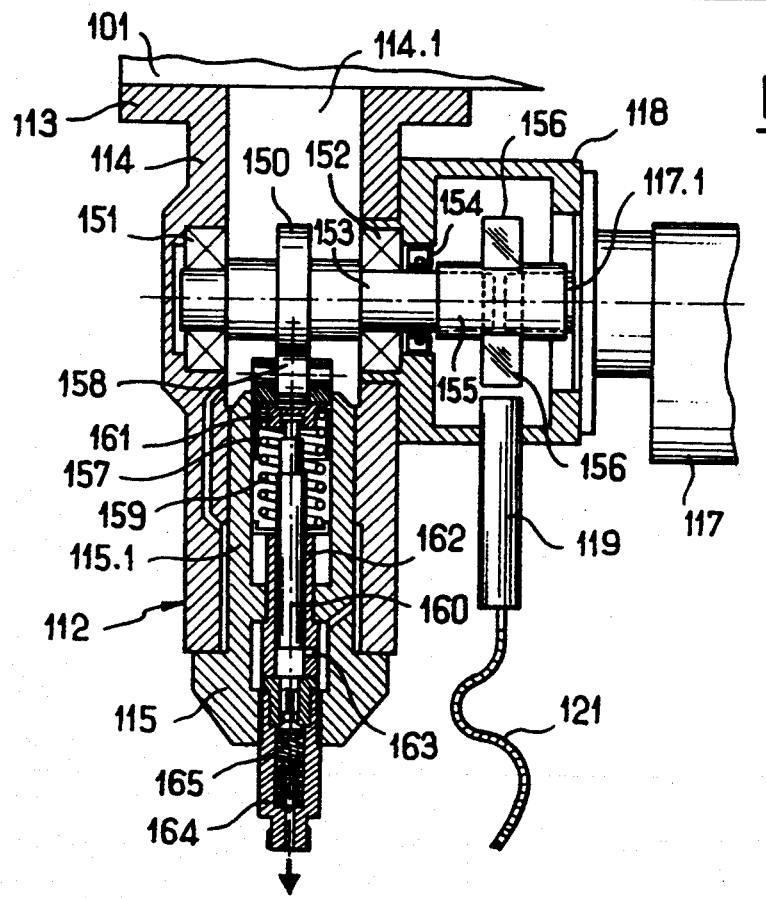

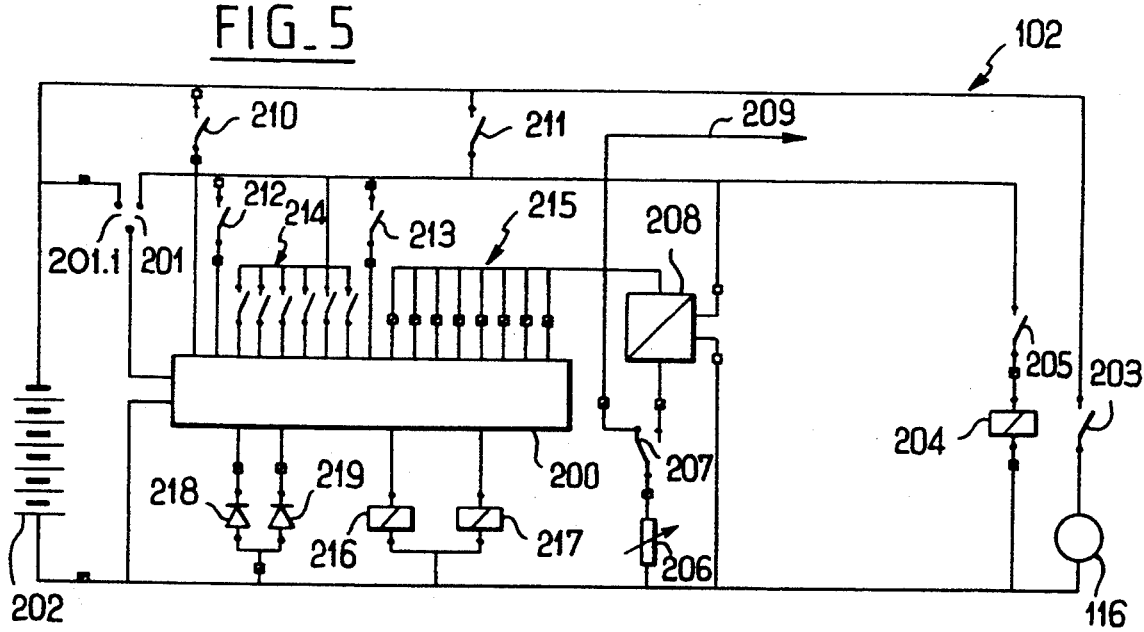
FIG_5
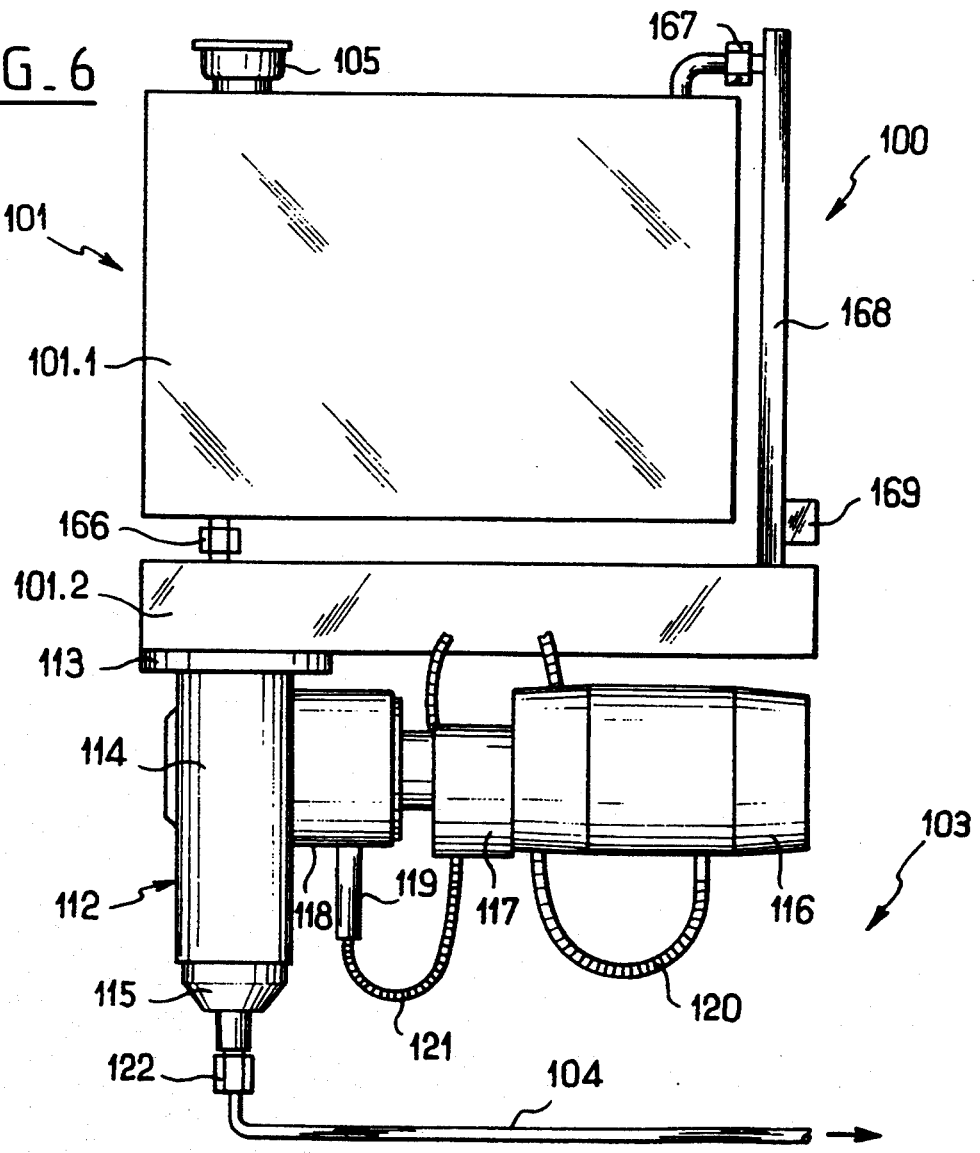
FIG_6

METHOD AND DEVICE FOR AUTOMATIC INJECTION OF AN ADDITIVE INTO THE FUEL TANK OF A MOTOR VEHICLE

FIELD OF THE INVENTION

The present invention relates to the automatic injection of additives into the fuel tank of motor vehicles.

BACKGROUND OF THE INVENTION

The injection of additives is quite particularly of interest in the case of diesel engines, and additives can be envisaged which are intended for reducing the formation of soot during the burning of diesel fuel and/or lowering the self-ignition temperature of the soot, or more generally additives intended for lubricating the liquid fuel, or alternatively various organometallic compounds.

The injection of additives has long been used by petroleum plants, when the fuel is still stored in the storage vessel, so that the additive is ipso facto incorporated into the fuel when it is delivered to the petrol stations.

In this case, it is a technique which does not require high precision in the metering, because hugh volumes are dealt with.

For several years, motor vehicle manufacturers have sought to develop techniques for automatic injection of additives into the fuel tank of a motor vehicle or, from an on-board additive tank.

In this case, the injection method must be as accurate as possible, in order to have a concentration held at the value desired, and the associated device must be flexible, compact and robust. The additive/fuel mixture must furthermore be as homogenous as possible.

One advantageous technique is illustrated in document U.S. Pat. No. 4,621,593.

In this document, an immersed solenoid pump is used for withdrawing some of the additive from the additive tank, downstream of which is provided a pipe arriving at the top of the fuel tank. When refuelling, the corresponding level variation is detected by a float mounted at the end of a pivoting arm, the articulation of which carries a rheostat system, which allows an on-board computer to deduce from this resistance the quantity of additive which it is necessary to withdraw, and accordingly to control the immersed solenoid pump.

The injection is thus carried out at low pressure (of the order of $5.10^5$ Pa), and the additive is released onto the surface of the fuel, directly leaving through the associated pipe. Because of this, the mixture is never truly homogeneous: the additive injected generally has a different density from that of the fuel, so that this additive tends to remain in the form of a layer (at the top or at the bottom of the tank), so that the fuel pumped from the bottom of the tank by the injection pump of the engine is not certain to have the desired concentration. Furthermore, the computer is not designed to allow any subsequent operation: the concentration is determined once only, which leads to a certain inflexibility when it is desired in particular to use the same system with other additives.

The document DE-C-3,626,419 illustrates a system similar to the preceding one, but described more briefly. Here again, the additive injected is being released at the top of the fuel tank, through a bent tube whose other end emerges directly into the filler tube. Because of this, the accuracy and the homogeneity of the mixing are necessarily limited.

It has also been proposed, in order to improve the precision of the metering obtained with conventional pump systems, to use a withdrawal syringe, whose plunger is directly coupled to a float arm associated with the level of fuel in the tank. Such a technique is in practice very difficult to implement. Furthermore, the aforementioned drawbacks relating to the low degree of homogeneity of the mixture and the inflexibility of the system as regards the concentration of the mixing are again encountered.

The aforementioned techniques involve the injection of additive when the vehicle is stationary and turned off, which is in general preferable for safety reasons. Furthermore, the driver can then easily check that the injection is proceeding correctly, and possibly be alerted in time in the event of a difficulty (insufficient additive level, for example).

Injection techniques operating when the vehicle is running have also been proposed.

In one case, it was sought to carry out automatic injection of additive as a function of the variation in level following refuelling (as illustrated in document FR-A-2,668,203), whereas in other cases, it was sought to carry out injection of additive as a function of the fuel consumption in the engine (as illustrated in document EP-A-0,269,228).

The technique illustrated in document FR-A-2,668,203 provides for the injection of additive to be carried out through a duct connecting the tank to the delivery part of the fuel injection pump. The injector thus connected up to the return duct of the fuel injection pump carries out injection at constant pressure for a calculated time, by correspondingly controlling an associated rotary pump. A pressure limiter thus ensures that the additive flow rate is constant. The accuracy of the metering is therefore necessarily limited, even if the operating times of the pump are calculated with precision.

Furthermore, such injection carried out in the return duct does not make it easy to obtain accurate metering, and therefore necessarily assumes that the vehicle is running, so that the injection pump delivers the quantity of additive injected, which would otherwise flow slowly through this duct. It is indicated in this document that the operation of the fuel injection pump provides a stirring effect which favours the obtaining of a more homogeneous mixture, but this effect is necessarily limited in as much as the additive injection is carried out under low pressures (in general not more that $7.10^5$ Pa). Furthermore, this technique still remains inflexible as regards the proportion chosen for the additive, the metering being essentially fixed.

The technique illustrated in document EP-A-0,269,228 is for its part highly complex to implement, and the device is bulky. It is not however absolutely necessary to seek "real time" additive injection, as a function of the fuel consumption in the engine.

OBJECT OF THE INVENTION

One object of the invention is to provide a method and a device for automatic injection of additive which does not have the drawbacks and/or limitations of the aforementioned techniques.

A further object of the invention is therefore to produce a method and device for automatic injection of additive which allows accurate metering, which can be adjusted at will, as well as an optimally homogenized mixture, even when the additive and the fuel in question are poorly miscible, and with a structural embodiment which is both compact and robust.

Another object of the invention is to produce a method and device for automatic additive injection which can be used for vehicles which were not initially intended for this purpose, in particular without requiring conversions and/or machining to be carried out on the tank of the vehicle.

SUMMARY OF THE INVENTION

The invention more particularly relates to a method for automatic injection of an additive into the fuel tank of a motor vehicle, from an on-board additive tank, characterized in that:

the quantity of additive to be withdrawn from the additive tank is determined using an on-board computation unit, as a function, on the one hand, of the variation in level of the fuel in the fuel tank following refuelling, and, on the other hand, of a predetermined proportion set-point, and the quantity of additive thus determined is injected by pulsed atomization, this atomization being carried out directly into the liquid bulk of the fuel.

The pulsed atomization, which is radically different from the low-pressure injections hitherto used, makes it possible to generate vigorous stirring of the additive/fuel mixture, even when the vehicle is stationary.

Preferably, the proportion set-point can be adjusted by programming a console provided for this purpose in the on-board computation unit and/or by direct operation on this computation unit.

Also advantageously, the pulsed atomization of the additive is carried out by controlling a positive-displacement piston pump which is interposed between the additive tank and the fuel tank, with a number of piston strokes which is determined automatically as a function of the quantity of additive to be withdrawn.

It is moreover advantageous to provide that the appearance of a minimum level of the additive contained in the additive tank is detected, which minimum level is determined such that it is still possible to withdraw a quantity of additive corresponding to one fill of the fuel tank, and in that a luminous and/or audible alarm is triggered when such a minimum level is detected.

A further subject of the invention is a device for automatically injecting an additive into the fuel tank of a motor vehicle, from an on-board additive tank, characterized in that it comprises:

an additive injection circuit connecting the additive tank to the fuel tank, the said circuit comprising a reciprocating positive-displacement pump arranged to withdraw a predetermined quantity of additive from the additive tank, a pipe going from the output of the aforementioned pump to the fuel tank, and penetrating therein, and an atomization member carried by this pipe, at the end of the latter, the said member being positioned in order to carry out pulse atomization of additive directly into the liquid bulk of the fuel; and an on-board computation unit used for determining the quantity of additive to be withdrawn from the additive tank, and controlling the actuation of the reciprocating positive-displacement pump as a function of the quantity of additive thus determined.

Preferably, the reciprocating positive-displacement pump is a piston pump, and the on-board computation unit automatically determines the number of piston strokes as a function of the quantity of additive to be withdrawn. In this case, advantageously, the positive-displacement piston pump is mounted directly below the additive tank, which makes it possible to have self-lubrication which eliminates any requirement for having a booster pump, as well as self-priming of the positive-displacement pump, which is consequently under pressure.

It is moreover advantageous that the pipe extends into the fuel tank through the opening associated with the filler cap of this tank, passing through a sleeve forming a filler extension, and is extended by a submerged portion, at the end of which the atomization member is mounted. In particular, the pipe is rigidly attached to the filler extension, for example being welded thereto, the said extension furthermore carrying, on the outside, a contact member with which the cap of the tank mounted at the top of its extension interacts, the said contact member being connected to the computation unit in order to transmit data relating to the opening and reclosing of the said cap.

Also advantageously, the computation unit is programmable and/or comprises a set-point unit, so that the proportion set-point of the quantity of additive to be withdrawn from the additive tank can be adjusted. It is furthermore advantageous to provide that the computation unit is powered by the battery of the vehicle, and that the contact member associated with the cap of the tank is mounted so as to be powered up when the switch of the vehicle is turned off.

Other characteristics and advantages of the invention will emerge more clearly on reading the following description and the attached drawings, which relate to a particular embodiment, with reference to the accompanying drawings.

BRIEF DESCRIPTION OF THE DRAWINGS

FIG. 1 is a view in elevation of one embodiment of an additive injection device according to the invention, with its on-board computation unit, and its positive-displacement piston pump, as well as the associated outlet pipe which goes to the tank;

FIG. 2 is a plan view of the device of FIG. 1;

FIG. 3 is a schematic view of the fuel of the fuel tank of a vehicle, illustrating atomization of the additive directly into the liquid bulk, which tank is equipped here with a float level sensor;

FIG. 4 is an enlarged cross-section illustrating the positive-displacement piston pump of FIG. 1, which is to be mounted under the additive tank;

FIG. 5 is a block diagram associated with the on-board computation unit;

FIG. 6, is a view similar to FIG. 1, illustrating a modification.

DETAILED DESCRIPTION OF THE PRESENTLY PREFERRED EMBODIMENTS

FIG. 1 is a partial illustration of a device 100 for automatic injection of an additive into the fuel tank of a motor vehicle, from an on-board additive tank. In FIG. 1, an on-board additive tank 101 is seen against which is mounted a casing 102 containing an on-board computation unit, with in addition an additive injection circuit 103 connecting the additive tank 101 to the fuel tank of the vehicle, the other part of the additive injection circuit 103 being represented in FIG. 3, which shows the fuel tank 130 in which is arranged an atomization member 124 constituting the end of this additive injection circuit 103. The additive tank 101 has, at the top, a filler cap 105 of conventional type, and this tank is equipped with a level detector 106 connected by a cable 111 to the computation unit 102. In the case in point, the level detector 106 is of the type comprising a fixed rod extending vertically inside the tank 101, as far as a stop 108, on which rod a float 107 freely slides, which for example consists of a hollow body containing a magnet intended to interact with an associated magnetic contact 109 (arranged at the bottom of the fixed rod) corresponding to a minimum level of the additive contained in the tank 101. In FIG. 1, the tank 101 is represented half filled with additive 110, the corresponding level being referenced 110.1. It should be noted that the presence of the stop 108 makes it possible to detect the appearance of a minimum level of additive, which is determined such that it is still possible to withdraw a quantity of additive corresponding to one fill of the fuel tank 130, the appearance of such a minimum level being capable of triggering a luminous and/or audible alarm when this minimum level is detected, by means of the associated magnetic contact 109. This minimum volume of additive will naturally be a function of the type of additive injected, and also of the type of motor vehicle in question. By way of indication, the minimum volume might be of the order of one liter. As is represented in FIG. 2, the tank 101 is here formed with a front reinforcement making it possible to accommodate the casing 102 associated with the computation unit, so that the whole can be produced in a particularly compact manner. By way of indication, the assembly represented in top view in FIG. 2 might be produced with a size of the order of 100 mm×350 mm.

A description will now be given of the pumping means which are intended for withdrawing a predetermined quantity of additive from the additive tank 101, these means being designed to allow injection by pulsed atomization of a determined quantity of additive directly into the liquid bulk of the fuel situated in the fuel tank 130.

Also seen in FIG. 1 is a pump assembly 112 constituting a reciprocating positive-displacement pump, with a pump body 114 which is here mounted by means of a fastening flange 113 under the additive tank 101. Such mounting of the reciprocating positive-displacement pump is advantageous in so far as the additive passing through the pump simultaneously lubricates the moving elements of this pump. Furthermore, this arrangement provides self-priming of the positive-displacement pump which is thus under pressure, with the consequence of further improved metering precision. The lower part of the pump 115 is directly connected to a pipe 104 by an associated connector 122. The drive means associated with the reciprocating positive-displacement pump 112 are also seen in FIG. 1. Thus, an electric motor 116, an associated reducing gear 117, and a mechanical linkage assembly 118 for coupling between the pump 112 and the motor/gear reduction unit 116, 117 are seen, which assembly is in general called a "lantern" coupling by specialists in the field. The motor 116 is connected by a cable 120 to the associated control unit 102, and the member 119 is further seen, connected by an associated cable 121 to the control unit, which is provided to control the volume of additive delivered by the reciprocating positive-displacement pump 112 upon each cycle of the latter. It is preferably a revolution counter member whose operation will be described herein in detail with reference to FIG. 4. The on-board computation unit 102, whose arrangement will be better understood by referring to FIG. 5, is used for determining the quantity of additive to be withdrawn from the additive tank 101, and controls the actuation of the reciprocating positive-displacement pump 112 as a function of this determined quantity of additive. As will be seen, and according to one characteristic of the invention, the quantity of additive to be withdrawn from the additive tank 101 is determined as a function, on the one hand, of the level variation of the fuel in the fuel tank 130 following refuelling, and, on the other hand, of a predetermined proportion set-point.

Reference will now be made to FIG. 3 in order to describe the other end of the additive injection circuit 103, the aforementioned pipe 104, which comes from the outlet of the reciprocating positive-displacement pump 112, extending into the fuel tank 130.

In the case in point, the pipe 104 extends into the fuel tank 130 through the opening 133 associated with the filler cap of this tank, which avoids having to make any conversion on the body of the tank 130. It might have been envisaged to pass the pipe 104 through the cap of the tank, but such an assembly would be inconvenient in practice, and would risk introducing undesirable displacements of the pipe 104 whose submerged end supports the atomization member 124. In order to avoid this drawback, a sleeve 134 has been provided here, forming a filler cap extension, which sleeve has at the bottom a locking system identical to that which is normally provided on the cap of the tank, and at the top a locking system identical to that which is normally provided on the neck of the tank, in order to allow mounting of a conventional cap 135. The sleeve 134 is thus mounted on the fuel tank 130 neck 132, and this sleeve is closed by a conventional cap 135. The pip 104 then passes through the sleeve 134, being preferably rigidly attached thereto, for example by welding. It should be observed that such an arrangement eliminates any operation to be carried out on the fuel tank which is not initially intended to be combined with an additive injection device. It therefore becomes easy to equip existing vehicles with a device according to the invention, since it is sufficient to insert the pipe portion supporting the atomization member into the fuel tank, and to fix the assembly by simply fitting the sleeve forming the extension. The pipe 104 is then extended by a submerged portion 104.1, as far as a connector 123 by which the atomization member 124 is fixed.

It is important to note that the atomization member 124, arranged to produce injection by pulsed atomization of the additive, requires the additive to arrive at high pressure, which is obtained using a reciprocating positive-displacement pump making it possible to work at pressures greatly in excess of $20 \times 10^5$ Pa. Such pulsed atomization, carried out directly into the liquid bulk of the fuel, produces, on each cycle, vigorous stirring of the liquid, as if mechanical stirring members immersed in the fuel were used. By virtue of this stirring effect, intimate additive/fuel homogenization is achieved, even in the case when the two liquids in question are poorly miscible.

In the case in point, an itemization member 124 has been illustrated whose structure allows adjustment of the atomization carried out. In fact, the support for the atomization member 124 is provided by a lateral connector 129, so as to unencumber the rear end of the body of this atomization member, at which end an adjustment screw 128 is provided, making it possible to vary the calibration of the spring of the atomization member, and an associated locknut 127 locking the determined position of this adjustment screw. The spray 126, formed in front of the head 125 of the injection member 124, should be directed and positioned so that its mechanical stirring effect is optimized. The height h for positioning of the atomization member 124 above the bottom of the tank 130 will be chosen carefully, as will the inclination of the axis of this atomization member 124, the inclination being here horizontal. For the height h, a sufficient distance from the bottom will in practice be chosen in order to avoid the spray reaching the bottom of the tank too quickly, while in general adopting a medium height which is sufficient for it to be certain that the atomization member 124 is always submerged in the fuel. It is obvious that, as a variant, a different orientation of the atomization member 124 could be chosen, for example by planning to arrange the axis above the said member along an essentially vertical direction. In order to retain correct holding of the atomization member 124, a rigid 104 will in practice be used, for example a metal tube with a diameter of approximately 8 mm.

A tank 130 containing the fuel 131 whose level is referenced 131.1, is furthermore equipped, quite conventionally, with a means for detecting the fuel level. In the case in point, a detection probe 140 will be used which is fixed by an associated flange 139 to the body of the tank 130, this probe being composed of a vertical rod 141, at the lower end of which is provided a member 143 supporting an articulated float 146 arm 144, the said arm comprising a contact 145 interacting with a rheostat of the end member 143. The height of the level of the fuel in given by the inclination of the arm 144, and the corresponding signal is transmitted by an internal wire 142 from surrounding the rod 141, and extending in an output wire 138 which is connected to the central computation and control unit 102, as will be described hereinbelow with reference to FIG. 5. In this manner, the signal given by a level detection probe, which is already provided, is used to determine the quantity of additive to be withdrawn from the additive tank, which avoids having to provide a special level probe added with the additive injection device. Thus, an existing vehicle can easily be equipped, since the tank of this vehicle and the associated level probe can be used as they are, without adaptive conversion or special internal equipment.

Thus, and according to one of the characteristics of the method according to the invention, the quantity of additive can be determined as a function, on the one hand, of the variation in level of the fuel in the fuel tank following refuelling, and, on the other hand, of a predetermined proportion set-point.

It is moreover of interest to note in FIG. 3 the presence of an external contact 136 mounted on the sleeve 134 forming the extension, this contact being connected to the central computation and control unit 102 by an associated connection wire 137. This is a contact which interacts directly with the cap 135, in order to deliver a first signal when the cap is removed, and a second signal when this cap is replaced, which makes it possible to initialize the injection cycle of the pulse atomization of the determined quantity of additive, when the cap has been reclosed.

As already stated herein above, it is preferred to use a reciprocating positive-displacement pump in order to be able to inject the additive by pulsed atomization directly into the liquid bulk of the fuel. In a preferred embodiment, A positive-displacement piston pump will be used, and the pulsed atomization of the additive will be carried out by controlling this pump with a number of piston strokes which is determined automatically as a function of the quantity of additive to be withdrawn. A diaphragm pump might be used as a variant, but a piston pump seems best suited to the requirements.

The essential structural members of such a pumping assembly will be described with reference to FIG. 4.

The pump body 114 has a tubular central shape, and it has on the inside rolling bearings 151 and 152 allowing mounting of a cam 150 whose axis is essentially perpendicular to the axis of the pump body. The cam 150, whose profile is determined as a function of the chosen atomization cycle, interacts directly with a roller 158 which is rotationally mounted at the top of a roller-support shell 157, which slides axially in a tubular portion 115.1 covering the lower part of the pump 115. The roller 158 is held in contact with a cam 150 by an associated spring 159, which also acts on a spring cap 161 to which the upper end of a rod-shaped piston 160 is coupled, which piston slides through a pump liner 162 for the passage of the additive on each atomization cycle, the additive then passing through an outlet adapter 164, inside which a non-return valve 165 loaded by an associated calibrated spring is provided.

The cam shaft 150 moreover extends, laterally of piston 112, a portion thereof being rotatable in bearing 152 and a portion 153 passing through a lipseal 154 into the lantern 118. Aligned with shaft portion 153 is the output shaft 117.1 of the reduction gear 117 which also extends into the lantern 118. The two shaft 117.1 and 153 fit into a common cylindrical sleeve 155, and these two ends are formed with a transverse, e.g. diametral, end groove which allows passage of a diametral coupling plate 156, which is a single or double plate. In the case in point, a single plate 156 as here been illustrated, the first function of which is to produce direct coupling for driving the cam 150, but which here also fulfils, by interacting with a revolution counter 119, an additional function of monitoring the volume of additive delivered by the positive-displacement piston pump, using direct counting of the piston strokes of this pump.

Such a pump assembly is perfectly adapted for delivering a high pressure of 40 to $50 \times 10^5$ Pa, which pressure is favourable for obtaining pulsed atomization which can generate an efficient stirring effect. The tests carried out tended to show that the power consumed by the injection device is actually very small, for example less than 100 watts, which makes it possible to use drive means for the pump which are small in size (to within operating efficiency, all the energy supply is used for the atomization).

The on-board computation unit 102 is thus designed for automatically determining the number of piston strokes as a function of the quantity of additive to be withdrawn from the additive tank. A block diagram associated with this on-board computation unit 102 will now be described with reference to FIG. 5.

The on-board computation unit 102 is here powered by the battery 202 of the vehicle, which allows not only advantageous independence of operation, but also operation of the injection device when the vehicle is stationary, and switched off. It is obvious that the contact member associated with the cap of the tank will in this case be mounted so as to be energized when the switch of the vehicle is off, because the corresponding data are used for initializing the cycles of pulsed atomization of additive into the liquid bulk of the fuel.

The central member of the on-board computation unit 102 consists of a computer or miniaturized programmable machine 200. A unit 215 for digitizing the fuel level is associated with the computer 200, this unit being connected to a digital/analog converter 208 which may be connected to a fuel tank gauge 206 when the associated relay 207 is switched, the other position of this relay corresponding to the supplying of a line 209 associated with the normal indication of the fuel level using an indicator light on the dashboard of the vehicle. A set-point unit 214 is associated with the programmable computer 200 is also seen, here diagrammatically represented in the form of a 6-part unit, which allows adjustment of the proportion set-point by programming a console (not shown here) provided for this purpose in the casing of the on-board computation unit and/or by direct operation on this computation unit. Such a set-point unit constitutes a very important advantage, in as much as it becomes possible to adapt the pulsed-atomization conditions to each specific case, in particular to each type of additive used.

The other switching members illustrated are of entirely conventional type, so that it will be sufficient to mention their presence in brief. A contact relay 203 associated with the drive motor of the pump 116, the associated coil, adjacent to a relay 205, and referenced 204, are also shown. The coils 216 and 217 of the relays 205, 207 are also shown, which relays comprise an amplification stage making it possible to have higher currents, with a view to a satisfactory circuit-breaking power in combination with the programmable computer 200. Light-emitting diodes 218 and 219 are also provided, these diodes being associated with indicator lights (not shown here) corresponding to normal operation or to detection of a fault. A relay 212 associated with the minimum level of additive in the additive tank is also shown, as are a relay 213 which is associated with the revolution counter of the pumping unit (that is to say with the counting of the piston strokes of the positive-displacement piston pump), a relay 210 associated with the cap contact (and therefore connected to the aforementioned contact member 136), and an automatic locking relay 211. Finally, the possibility of a two-fold connection option 201, 201.1 has been illustrated: The connection 201.1 corresponds to permanent supply by the battery 202, which makes it possible to use a monitoring light, whilst the connection 201 corresponds to supply through the relays 210 and 211, which makes it possible to avoid any unused energy consumption when the programmable computer 200 is not used.

When the relay 207 is switched so as to connect the gauge 206 to the converter 208, subsequent opening and closing of the filler cap of the fuel tank are associated with two successive readings of the fuel level, and comparison of the corresponding signals makes it possible to determine, by computation, the volume of additive necessary for the chosen proportion. As stated hereinabove, the proportion set-point is preferably adjustable by programming and/or by direct operation on the computation unit.

Finally, FIG. 6 shows a variant in which the additive tank is arranged so as to removable. Correspondingly, an additive tank 101 comprising a main unit 101.1 is seen, as is a reserve unit 101.2 under which a pumping assembly corresponding to the one described hereinabove is mounted. The reserve unit 101.2, whose capacity corresponds substantially to the volume of additive necessary for one fill of the fuel tank, is surmounted by a vent tube 168 equipped with a low-level contact 169. The main unit of the tank 101.1 is advantageously connected to an assembly permanently mounted on the vehicle by two automatically perforating connectors 166 and 167, which makes it possible to use additive tanks stored in "cartridge" form. Once the unit 101.1 has been mounted in place, the procedure is the same as for the previously described fixed unit. When the main unit 101.1 is empty, the low-level contact 169 produces a warning signal, and the reserve unit 101.2 makes it possible to ensure that it is still possible to carry out pulsed atomization of a quantity of additive corresponding to one fill of the fuel tank.

The invention is not limited to the embodiment which have just been described, but moreover encompasses any variant which reproduced, with equivalent means, the essential characteristics described hereinabove.

What we claim is:

1. A method for automatic injection of an additive into the fuel tank of a motor vehicle, from a on-board additive tank, said method comprising the steps of:
   determining the quantity of additive to be withdrawn from the additive tank using an on-board computation unit as a function of (i) the variation in level of the fuel in the fuel tank following refueling, and (ii) a predetermined proportion set-point; and
   injecting the thus determined quantity of additive by pulsed atomization directly into the liquid bulk of the fuel in said fuel tank.

2. A method as claimed in claim 1, further comprising the step of adjusting said proportion set-point by programming a-console provided for this purpose in the on-board computation unit.

3. A method as claimed in claim 1, wherein the pulsed atomization of the additive is carried out by controlling a positive-displacement piston pump interposed between the additive tank and the fuel tank, with a number of piston strokes which is determined automatically as a function of the quantity of additive to be withdrawn.

4. A method as claimed in claim 1, further comprising the step of detecting the appearance of a minimum level of the additive contained in the additive tank which minimal level is determined such that it is still possible to withdraw a quantity of additive corresponding to one fill of the fuel tank and triggering a luminous alarm when such a minimum level is detected.

5. A method as claimed in claim 1, further comprising the step of adjusting said proportion set-point by directly operating a console provided for this purpose in the on-board computation unit.

6. A method as claimed in claim 1, further comprising the step of detecting the appearance of a minimum level of the additive contained in the additive tank which minimal level is determined such that it is still possible to withdraw a quantity of additive corresponding to one fill of the fuel tank and triggering an audible alarm when such a minimum level is detected.

7. Apparatus for automatically injecting an additive into the fuel tank of a motor vehicle, from an on-board additive tank, said apparatus comprising, in combination:
   a) a fuel tank;

b) an additive injection circuit connected to said additive tank and connectable to a vehicle fuel tank, comprising:
  bi) a reciprocating positive-displacement pump having an inlet and an outlet;
  bii) means connecting said additive tank to said pump inlet effective to withdraw a predetermined quantity of additive from the additive tank;
  biii) a discharge pipe having first and second ends, said first end being connected to the outlet of said pump and the second end being adapted to extend into said fuel tank; and
  biv) an atomization member mounted on the second end of the discharge pipe, said atomization member and said discharge pipe defining means for carrying-out a pulsed atomization of additive directly into the liquid bulk of the fuel in said fuel tank; and
c) an on-board computation unit capable of determining the quantity of additive to be withdrawn from the additive tank and controlling the actuation of the reciprocating positive-displacement pump as a function of the quantity of additive thus determined.

8. Apparatus as claimed in claim 7, wherein said reciprocating positive-displacement pump is a piston pump, and wherein the on-board computation Unit is capable of automatically determining the number of piston strokes as a function of the quantity of additive to be withdrawn.

9. Apparatus as claimed in claim 8, wherein the positive-displacement piston pump is mounted directly below the additive tank.

10. Apparatus as claimed in claim 7, wherein said fuel tank further comprises:
  a filler opening and a filler cap adapted to close said opening;
  a sleeve forming a filler opening extension associated with said filler opening; and
  wherein the discharge pipe extends through said sleeve effective to have a submerged portion at the end of which said atomization member is mounted.

11. Apparatus as claimed in claim 10, wherein the discharge pipe is rigidly attached to the filler extension, and further comprising on the outside of said extension a contact member with which said filler cap interacts, said contact member being connected to the computation unit in order to transmit data relating to the opening and reclosing of the said cap.

12. Apparatus as claimed in claim 7, wherein said computation unit comprises a set-point unit, whereby the proportion set-point of the quantity of additive to be withdrawn from the additive tank can be adjusted.

13. Apparatus as claimed in claim 11, wherein the computation unit is adapted to be powered by the battery of the vehicle, and the contact member associated with the cap of the tank is mounted so as to be energized when the switch of the vehicle is turned off.

14. Apparatus as claimed in claim 7, wherein said computation unit is programmable to define a set-point, whereby the proportion set-point of the quantity of additive to be withdrawn from the additive tank can be adjusted.

* * * * *